(12) United States Patent
Yamamoto

(10) Patent No.: US 6,952,073 B2
(45) Date of Patent: Oct. 4, 2005

(54) VIBRATION WAVE DRIVING APPARATUS, VIBRATION MEMBER AND DRIVING SYSTEM FOR THE VIBRATION WAVE DRIVING APPARATUS

(75) Inventor: Shinji Yamamoto, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 192 days.

(21) Appl. No.: 10/408,104

(22) Filed: Apr. 8, 2003

(65) Prior Publication Data

US 2003/0197447 A1 Oct. 23, 2003

(30) Foreign Application Priority Data

Apr. 18, 2002 (JP) ........................................ 2002-116156

(51) Int. Cl.[7] ................................................. H02N 2/00
(52) U.S. Cl. ........................... 310/323.06; 310/323.03; 310/323.04; 310/323.08
(58) Field of Search ....................... 310/323.02–323.19, 310/323.21, 328, 365, 366, 316–323

(56) References Cited

U.S. PATENT DOCUMENTS

| | | | | |
|---|---|---|---|---|
| 5,025,186 | A | * 6/1991 | Tsukada | ................ 310/323.06 |
| 5,484,216 | A | 1/1996 | Kimura et al. | ............... 400/319 |
| 5,854,529 | A | * 12/1998 | Ashizawa et al. | ...... 310/323.01 |
| 5,889,350 | A | 3/1999 | Yamamoto | ................... 310/316 |
| 5,939,851 | A | 8/1999 | Kataoka et al. | ............. 318/611 |
| 6,049,156 | A | 4/2000 | Yamamoto et al. | .... 310/316.01 |
| 6,054,795 | A | 4/2000 | Yamamoto et al. | .... 310/316.01 |
| 6,084,334 | A | 7/2000 | Yamamoto et al. | .... 310/316.01 |
| 6,100,622 | A | 8/2000 | Yamamoto et al. | .... 310/316.01 |
| 6,313,564 | B1 | 11/2001 | Kataoka et al. | ........ 310/316.01 |
| 6,376,965 | B1 | 4/2002 | Kataoka et al. | ............. 310/317 |
| 6,674,217 | B1 | * 1/2004 | Fujimoto | ................ 310/323.06 |
| 6,707,233 | B2 | * 3/2004 | Oda et al. | ............... 310/323.04 |
| 6,724,607 | B2 | * 4/2004 | Hayashi et al. | ........ 310/316.01 |
| 2002/0053858 | A1 | 5/2002 | Hayashi et al. | ........ 310/316.01 |
| 2002/0096970 | A1 | 7/2002 | Hayashi et al. | ........ 310/316.02 |
| 2002/0121869 | A1 | 9/2002 | Kataoka et al. | ............. 318/114 |

FOREIGN PATENT DOCUMENTS

| | | | | |
|---|---|---|---|---|
| JP | 3-45169 | * | 2/1991 | ................. 310/365 |
| JP | 3-45175 | * | 2/1991 | ................. 310/358 |
| JP | 2000-333477 | | 11/2000 | |
| JP | 2001-157473 | | 6/2001 | |

\* cited by examiner

Primary Examiner—Thomas M. Dougherty
(74) Attorney, Agent, or Firm—Fitzpatrick, Cella, Harper & Scinto

(57) ABSTRACT

The present invention relates to a vibration wave driving apparatus including: a vibration member which has an electro-mechanical energy conversion element having a plurality of electrode regions that are fixed to an elastic member and polarized in the same direction, and which generates a travelling wave that is obtained by synthesizing a plurality of standing waves different in phase on a surface of the elastic member by supplying an ac signal to the electro-mechanical energy conversion element; and a moving member which is in contact with the vibration member and driven by the travelling wave. The vibration wave driving apparatus of the present invention is characterized in that a plurality of wiring members are connected to a plurality of electrode regions of the electro-mechanical energy conversion element, and that wiring members used for generating standing waves having the same phase among the plurality of wiring members are arranged at intervals integer times the wavelength of the standing waves having the same phase.

17 Claims, 11 Drawing Sheets

VIBRATION WAVE DRIVING APPARATUS, VIBRATION MEMBER AND DRIVING SYSTEM FOR THE VIBRATION WAVE DRIVING APPARATUS

BACKGROUND OF THE INVENTION

1. Field of the Invention

The present invention relates to a vibration wave driving apparatus such as an ultrasonic motor which generates a vibration in an elastic member and gives a driving force to a moving member that is in contact with the elastic member by using the vibration in the elastic member, and a driving circuit therefore.

2. Related Background Art

An ultrasonic wave motor, which is one of the vibration wave driving apparatuses and which generates a travelling wave in an elastic member constructing a stator, generates a plurality of standing waves, each having a different phase, in the stator constructed of the elastic member and a piezoelectric element, and compose the standing waves to generate the traveling wave.

FIG. 8 shows an electrode pattern of a piezoelectric element disposed on an annular stator of the ultrasonic motor. An electrode region at a substantially right half side of FIG. 8 shows a first electrode group for generating a first standing wave (A-phase), and an electrode region at a substantially left side of FIG. 8 shows a second electrode group for generating a second standing wave (B-phase). When a driving signal is supplied to the first electrode group by a driving circuit (not shown), a first standing wave vibration is generated in the entire stator. When a driving signal is supplied to the second electrode group by a driving circuit (not shown), a second standing wave vibration is generated in the entire stator. The first standing wave and the second standing wave are equal in wavelength $\lambda$ to each other, and the first electrode group and the second electrode group are disposed in such a manner that the phases of those first and second electrode groups are shifted from each other by ¼ of wavelength $\lambda$. When those two standing waves are generated with the temporal shift of 90 degrees, the travelling wave is generated in the elastic member.

In case of the ultrasonic motor of the above system, the first standing wave generated in the first electrode group attenuates in the vibration amplitude more as the first standing wave is far from the first electrode group, and the vibration wavelengths of the first standing wave become different from each other. Similarly, the second standing wave generated in the second electrode group attenuates in the vibration amplitude more as the second standing wave is far from the second electrode group, and the vibration wavelengths of the second standing wave become different from each other.

In other words, the vibration amplitude and the vibration wavelength of the A-phase at the first electrode group portion are not completely equal to those at the second electrode group portion, and the vibration amplitude and the vibration wavelength of the B-phase at the first electrode group portion are also not completely equal to those at the second electrode group portion. As a result, the vibration amplitudes of the travelling wave obtained by synthesizing the first standing wave and the second standing wave are caused to be different from each other depending on the portions of the elastic member, thereby lowering the output of the ultrasonic motor. Also, when the ultrasonic motor is driven for a long period of time in a state where the vibration amplitude is varied, the amount of abrasion of the vibration member is different depending on the portions of the elastic member, and the output of the ultrasonic motor is lowered with lapse of time according to the fluctuation in the amount of abrasion.

In order to solve the above-mentioned problem, Japanese Patent Application Laid-Open No. 2000-333477 discloses that an electrode group for generating a first standing wave (A-phase) and an electrode group for generating a second standing wave (B-phase) are divided in such a manner that the first and second electrode groups are alternately arranged with spaces of ¼ of a wavelength $\lambda$ at the respective boundaries as shown in FIG. 9. This structure makes it possible to suppress the degree of attenuation of the vibration amplitude of the standing wave.

However, the invention disclosed in the above-mentioned Japanese Patent Application Laid-Open No. 2000-333477 is merely a method of slightly suppressing the degree of the variation in the vibration amplitude. Consequently, a phenomenon in which the vibrations of the first standing wave and the second standing wave are not uniformly excited over the entire vibration member is not eliminated, and differences still occur in the amplitude and the wavelength of the travelling wave depending on the portions of the elastic member.

There are other factors that cause variation in the amplitude and the wavelength of the travelling wave.

Electrode patterns shown in FIG. 8 and FIG. 9 are formed in such a manner that electrode regions which are polarized in a positive direction (+) toward a thickness direction of a piezoelectric element and electrode regions which are polarized in a negative direction (−) toward the same are adjacent to each other. The lines of electric force extend in parallel with the thickness direction in the substantially center portion of the electrode regions which are polarized in the positive direction and the substantially center portion of the electrode regions which are polarized in the negative direction. However, the lines of electric force extend over the electrode regions in a direction orthogonal to the thickness direction on the boundary portions between the electrode regions which are polarized in the positive direction and the electrode regions which are polarized in the negative direction. Because a difference occurs in the longitudinal elastic coefficient of the piezoelectric element depending on the directions along which the lines of electric force extend, the rigidity of the piezoelectric element is different depending on the portions thereof. For that reason, the propagation speed of the travelling wave partially changes, and variation occurs in the vibration amplitude and the wavelength of the travelling wave.

In order to improve the variation in the rigidity which is caused by a difference in the polarizing direction as described above, Japanese Patent Application Laid-Open No. 2001-157473 proposes the structure of a piezoelectric element shown in FIG. 10. The electrode pattern of the piezoelectric element divides the electrode regions every ¼ of the vibration wavelength $\lambda$, and allocates those electrode regions alternately as the first electrode group that generates the first standing wave and the second electrode group that generates the second standing wave. The electrode regions for generating those standing waves are polarized in the same direction over the entire electrode regions. Since the adjacent electrode regions are polarized in the same direction, all of the lines of electric force in those electrode regions extend in parallel to the thickness direction, and no difference occurs in the rigidity of the piezoelectric element depending on the portions thereof.

The structure shown in FIG. 10 is directed to a mode suitable for 4-phase driving as will be described later and can be realized even in other driving modes such as 3-phase driving. In order to realize such other driving modes, there are provided electrode regions equal to integer times the standing waves which are synthesized on the electrode regions corresponding to the wavelength λ of the travelling wave, and those electrode regions are polarized in the same direction.

Returning to FIG. 10, the same driving signals are supplied to the electrode regions of +A phase which are arranged every three regions. A driving signal which is temporally shifted by 90 degrees from the driving signal of +A phase is supplied to the electrode regions of +B phase which are adjacent to the electrode regions of +A phase in the clockwise direction. A driving signal which is opposite in phase to the driving signal of +A phase is supplied to the electrode regions of −A phase which are adjacent to the electrode regions of +B phase in the clockwise direction. Then, a driving signal which is opposite in phase to the driving signal of +B phase is supplied to the electrode regions of −B phase which are adjacent to the electrode regions of −A phase in the clockwise direction. Those respective electrode regions are arranged at intervals of ¼ of the wavelength λ of the standing wave generated by supplying the driving signal thereto. When the above-mentioned driving signals are supplied to the piezoelectric element, the first standing wave and the second standing wave which are shifted in phase from each other by ¼ of the wavelength λ are generated in the piezoelectric element. Because both of the first electrode group that generates the first standing wave and the second electrode group that generates the second standing wave are arranged at regular intervals over the entire periphery of the piezoelectric element, no variation occurs in the travelling wave.

FIG. 11 is a block diagram showing the circuit structure of an ultrasonic motor using the piezoelectric element shown in FIG. 10. An oscillation circuit 1 generates an ac signal corresponding to the driving frequency of the ultrasonic motor and the ac signal is inputted to a phase shifter 2 to generate an ac signal which is shifted in phase by 90 degrees. The ac signal which is shifted in phase by 90 degrees is inputted to another phase shifter 2 to generate an ac signal which is shifted in phase from the ac signal obtained by the oscillation circuit 1 by 180 degrees. The ac signal which is shifted in phase by 180 degrees is inputted to still another phase shifter 2 to generate an ac signal which is shifted in phase from the ac signal obtained by the oscillation circuit 1 by 270 degrees. In this way, the ac signals different in phase by 90 degrees, respectively, are generated, and then boosted up to voltages that enable the ultrasonic motor to be driven by the booster circuit 3, to thereby generate +A phase voltage, −A phase voltage, +B phase voltage and −B phase voltage which are shifted in phase by 90 degrees in the stated order, respectively. Those voltage waveforms are shown in FIG. 12.

When those +A phase voltage, −A phase voltage, +B phase voltage and −B phase voltage are supplied to the above-mentioned electrode region of +A phase, electrode region of −A phase, electrode region of +B phase and electrode region of −B phase, respectively, the travelling wave which is uniform in vibration amplitude is generated. With this structure, there can be realized the ultrasonic motor whose output is high and whose stator is not partially abraded.

When the electrode pattern of the piezoelectric element is formed as shown in FIG. 10, the vibration amplitude of the travelling wave can be made uniform. However, there is required a circuit for generating the ac signal of four phases as shown in FIG. 11.

Also, in the structure shown in FIG. 10, the electrode region of a sensor phase for detecting the vibration of the vibration member cannot be ensured. This is because when the electrode region which becomes the sensor phase is provided, the driving signal is not supplied to only the electrode region which becomes the sensor phase, and a variation occurs in the vibration amplitude.

SUMMARY OF THE INVENTION

According to an aspect of the present invention, a vibration wave driving apparatus includes:

a vibration member which has an electro-mechanical energy conversion element having a plurality of electrode regions that are fixed to an elastic member and polarized in the same direction, and which generates a travelling wave that is obtained by synthesizing a plurality of standing waves on a surface of the elastic member by supplying an ac signal to the electro-mechanical energy conversion element; and a moving member which is in contact with the vibration member and driven by the travelling wave, and in the vibration wave driving apparatus:

a plurality of wiring members are connected to the plurality of electrode regions of the electro-mechanical energy conversion element; and wiring members used for generating standing waves having the same phase among the plurality of wiring members are arranged at intervals integer times the wavelength of the standing waves having the same phase.

According to another aspect of the present invention, a vibration member includes an electro-mechanical energy conversion element having a plurality of electrode regions that are fixed to an elastic member and polarized in the same direction, and generates a travelling wave that is obtained by synthesizing a plurality of standing waves on a surface of the elastic member by supplying an ac signal to the electro-mechanical energy conversion element, and in the vibration member:

a plurality of wiring members are connected to the plurality of electrode regions of the electro-mechanical energy conversion element; and wiring members used for generating standing waves having the same phase among the plurality of wiring members are arranged at intervals integer times the wavelength of the standing waves having the same phase.

According to another aspect of the present invention, a driving system for a vibration wave driving apparatus includes:

a vibration wave driving apparatus which fixes an electro-mechanical energy conversion element having a plurality of electrode regions all of which are polarized in the same direction to an elastic member, and generates a travelling wave which is obtained by synthesizing a plurality of standing waves different in phase on a surface of the elastic member by supplying an ac signal to the electro-mechanical energy conversion element; and a signal supply circuit for generating the ac signal which is supplied to the electro-mechanical energy conversion element, and in the driving system for a vibration wave driving apparatus:

a plurality of wiring members which connect the signal supply circuit to the plurality of electrode regions of the electro-mechanical energy conversion element are provided; and wiring members used for generating standing waves having the same phase among the plurality of wiring members are arranged at intervals integer times the wavelength of the standing waves having the same phase.

Other objects and advantages besides those discussed above shall be apparent to those skilled in the art from the description of a preferred embodiment of the invention which follows. In the description, reference is made to accompanying drawings, which form a part hereof, and which illustrate an example of the invention. Such example, however, is not exhaustive of the various embodiments of the invention, and therefore reference is made to the claims which follow the description for determining the scope of the invention.

DETAILED DESCRIPTION OF THE PREFERRED EMBODIMENTS

Now, a description will be given in more detail of preferred embodiments of the present invention with reference to the accompanying drawings.

Figure 1:
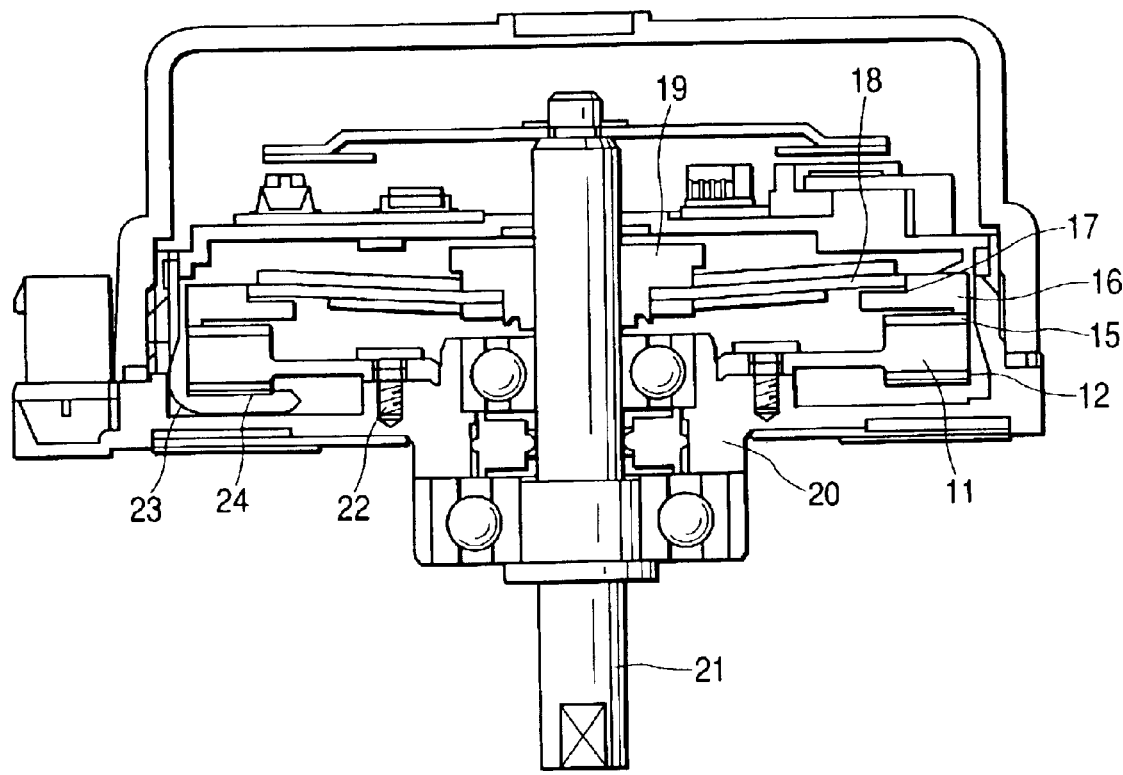
FIG. 1 is a cross-sectional view of an ultrasonic motor.

FIG. 1 is a cross-sectional view showing an ultrasonic motor which is an example of a vibration wave driving apparatus. Reference numeral 11 denotes an elastic member which is made of metal or the like and structures a vibration member, and a piezoelectric element 12 is fixed to a bottom surface of the elastic member 11 as an electro-mechanical energy conversion element shown in FIG. 11. A frictional material 15 made of resin is stuck onto an opposite surface of the elastic member 11 to the piezoelectric element 12 and the elastic member 11 is fixed to a motor housing 20 by screws 22.

Reference numeral 16 denotes a rotor as a moving member which is in contact with the frictional material 15 of vibration member and made of metal whose surface is subjected to a hardening process. The rotor 16 is urged against the elastic member 11 through a vibration-proof rubber 17 by a pressure spring 18. Reference numeral 23 denotes a wiring which is connected to a booster circuit 3 and a control circuit 4 which will be described later, and connected to a flexible substrate 24 which is fitted onto the surface of the piezoelectric element 12.

When an ac (alternating current) voltage is applied to the piezoelectric element 12 through the wiring 23 and the flexible substrate 24, a travelling wave is generated on the surface of the elastic member 11, and the rotor 16 rotates due to the travelling wave and the frictional force. The rotation of the rotor 16 is transmitted to a shaft 21 which is rotatably supported by a motor housing 20 through a pressure spring 18 and a disk 19.

Figure 2:
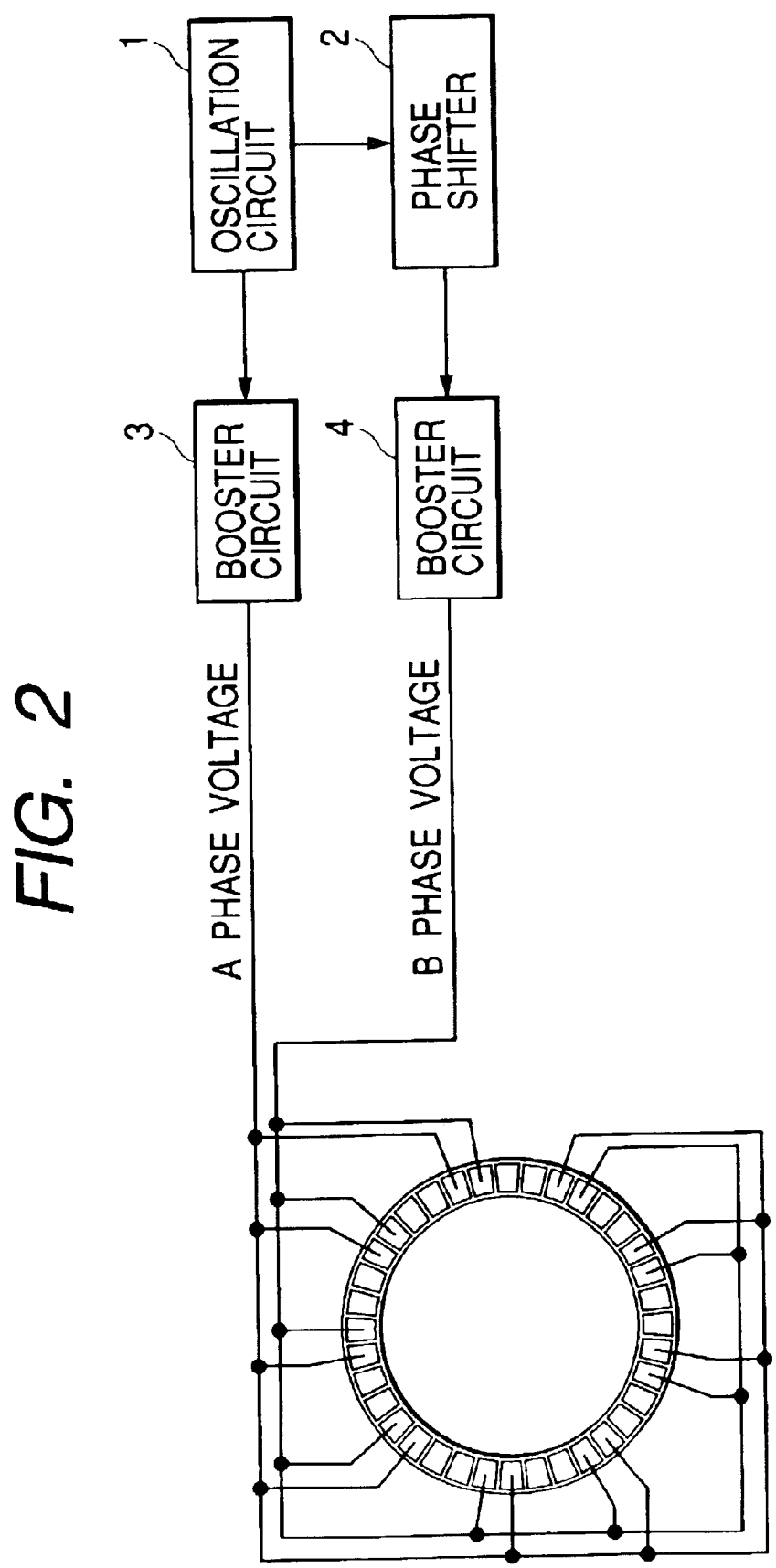
FIG. 2 is a block diagram showing the circuit structure of an ultrasonic motor in accordance with a first embodiment of the present invention.

FIG. 2 is a block diagram showing the circuit structure of an ultrasonic motor in accordance with a first embodiment of the present invention. The description on the operation of an oscillation circuit 1, a phase shifter 2 and the booster circuit 3 will be omitted because it is identical with that described with reference to FIG. 11.

Figure 10:
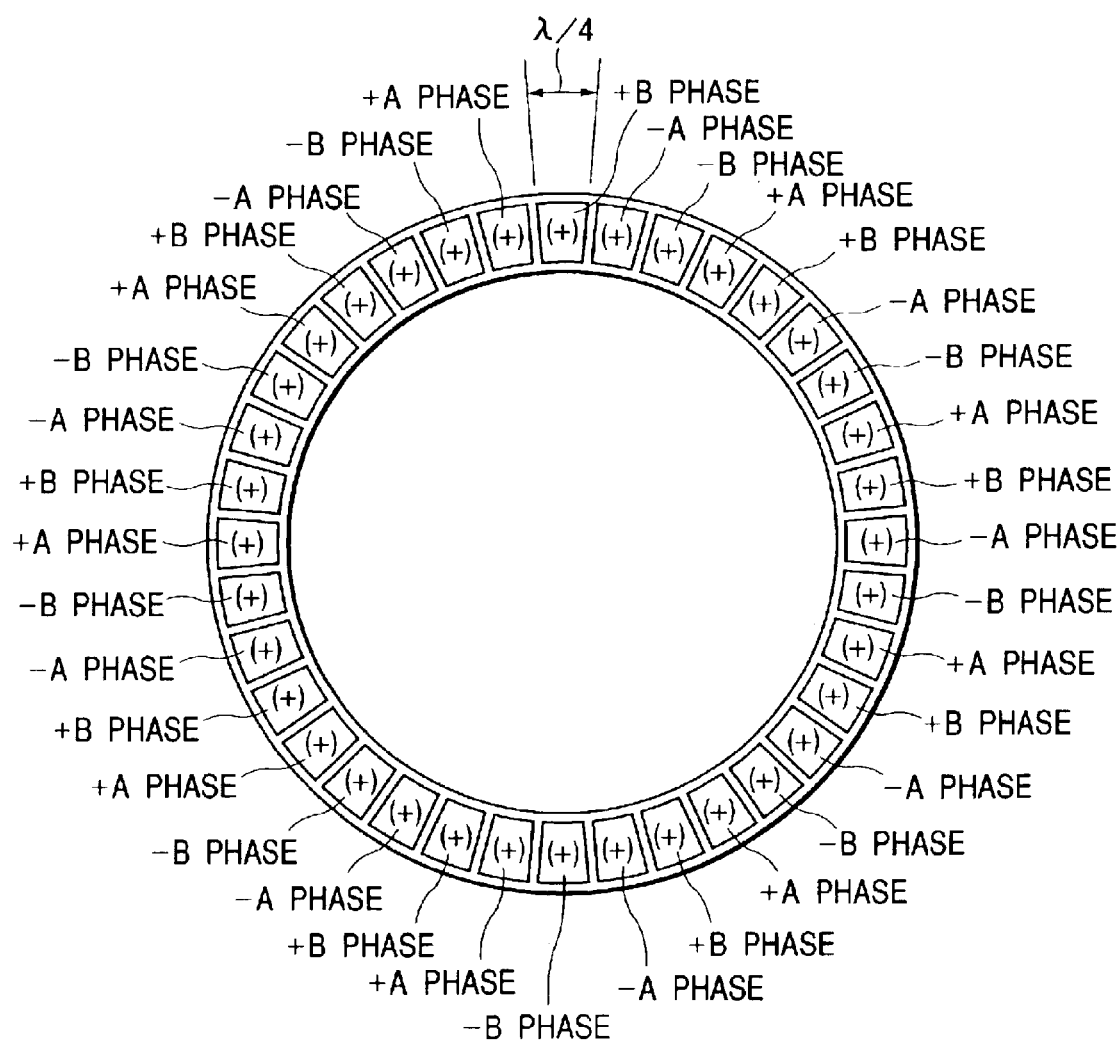
FIG. 10 is a diagram showing an electrode pattern of another conventional piezoelectric element having driving electrode regions in every ¼ of a wavelength λ of a standing wave.

Also, the electrode pattern of the piezoelectric element in accordance with this embodiment is identical with the above-mentioned electrode pattern shown in FIG. 10, and all of the electrode regions are polarized in the same thickness direction. Hence, no variation occurs in the peripheral rigidity.

The driving circuit of the ultrasonic motor in accordance with this embodiment allows the piezoelectric element having the electrode regions all of which are polarized in the same direction to generate the standing waves of two phases due to the two-phase driving signal, and synthesizes the two-phase standing waves to form a travelling wave.

Figure 3:
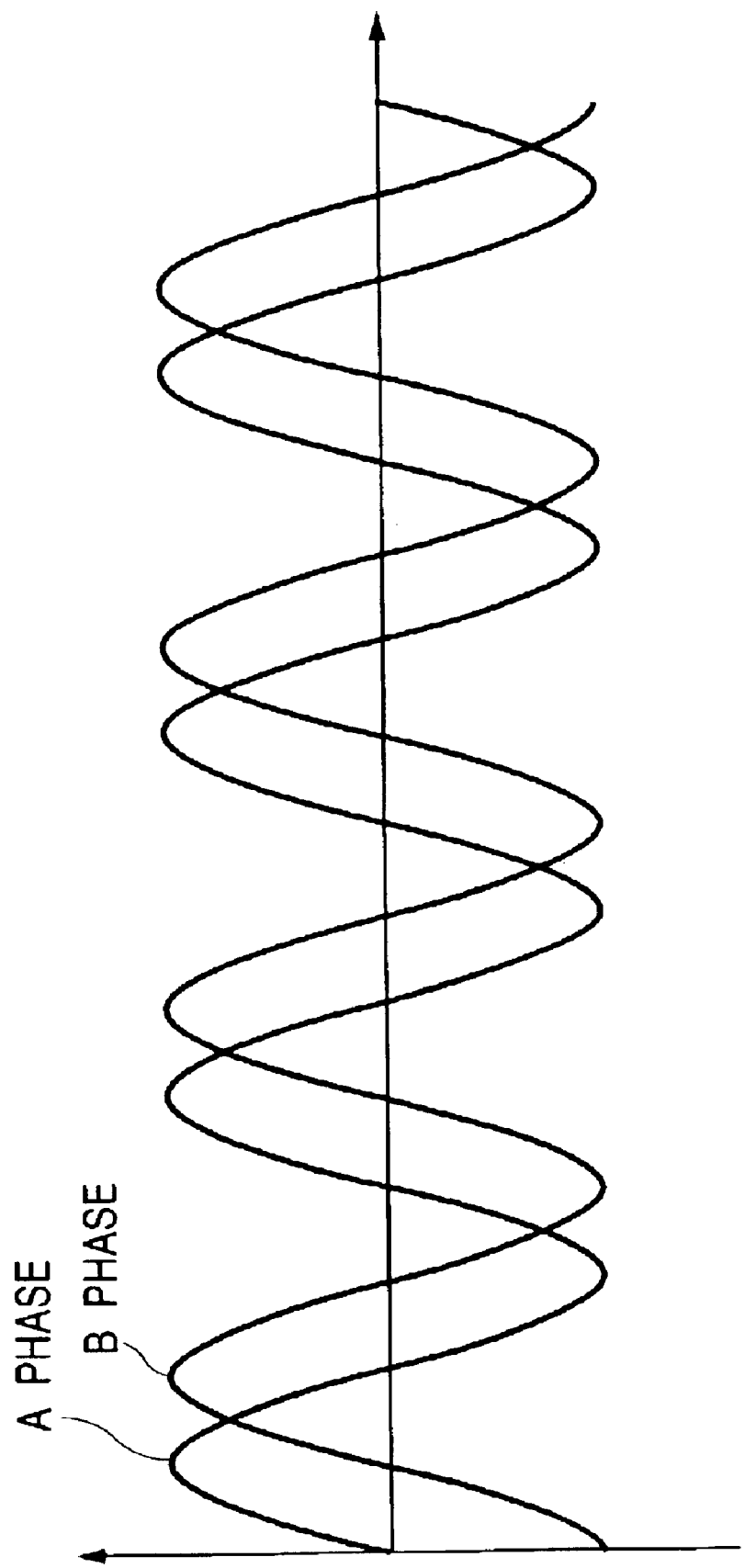
FIG. 3 is a graph showing a driving signal waveform of the circuit shown in FIG. 2.

FIG. 3 shows a voltage waveform of the driving signal in this embodiment. Ac voltages which are different in temporal phase from each other by 90 degrees are applied to only the electrode region of +A phase and the electrode region of +B phase in the electrode pattern shown in FIG. 10 by using a wiring member such as a flexible substrate or the like. That is, the ac voltages are applied to only the electrode regions corresponding to one anti-node of one wavelength in each of the first standing wave and the second standing wave for forming the travelling wave. Because the electrode regions to which the ac voltages are applied for generating the respective standing waves are arranged over the overall periphery of the annular vibration member at regular intervals, the vibration amplitudes can be made uniform. In this situation, the electrode region of −A phase and the electrode region of −B phase are electrically released.

The annular vibration member has positions of the node of the vibration and the anti-node of the vibration determined when the standing wave is excited according to the configuration and dynamic stiffness thereof. Therefore, when the piezoelectric element is arranged at a position which becomes the anti-node of the standing wave, even in the case where the electrode regions of the −A phase and the −B phase are released, and the ac voltages are applied to only the electrode regions of the +A phase and the +B phase, the same standing waves as that in the case where the ac voltages are applied to all of the electrode regions of the +A phase, the +B phase, the −A phase and the −B phase can be generated.

In FIG. 2, the ac voltage is applied to the electrode regions corresponding to the anti-node of the standing wave of A phase, which are positioned every cycle of the standing wave of A phase, and the ac voltage is applied to the electrode regions corresponding to the anti-node of the standing wave of B phase, which are positioned every cycle of the standing wave of B phase. However, the present invention is not limited to this structure. Even in a mode where the ac voltage is applied to one electrode region with respect to the regions of integer times the vibration wavelength of the respective standing waves such as the electrode regions which are positioned every two cycles or three cycles of the respective standing waves, the same standing waves as that in the case where the ac voltages are applied to all of the electrode regions of the +A phase, +B phase, −A phase and −B phase can be generated.

As described above, according to this embodiment, there can be structured a driving circuit for the ultrasonic motor which includes a vibration member where no variation occurs in the travelling wave, and which reduces the number of driving circuits as compared with the conventional circuit. In this embodiment, electrodes that are not used are electrically released, but may be grounded instead.

Figure 4:
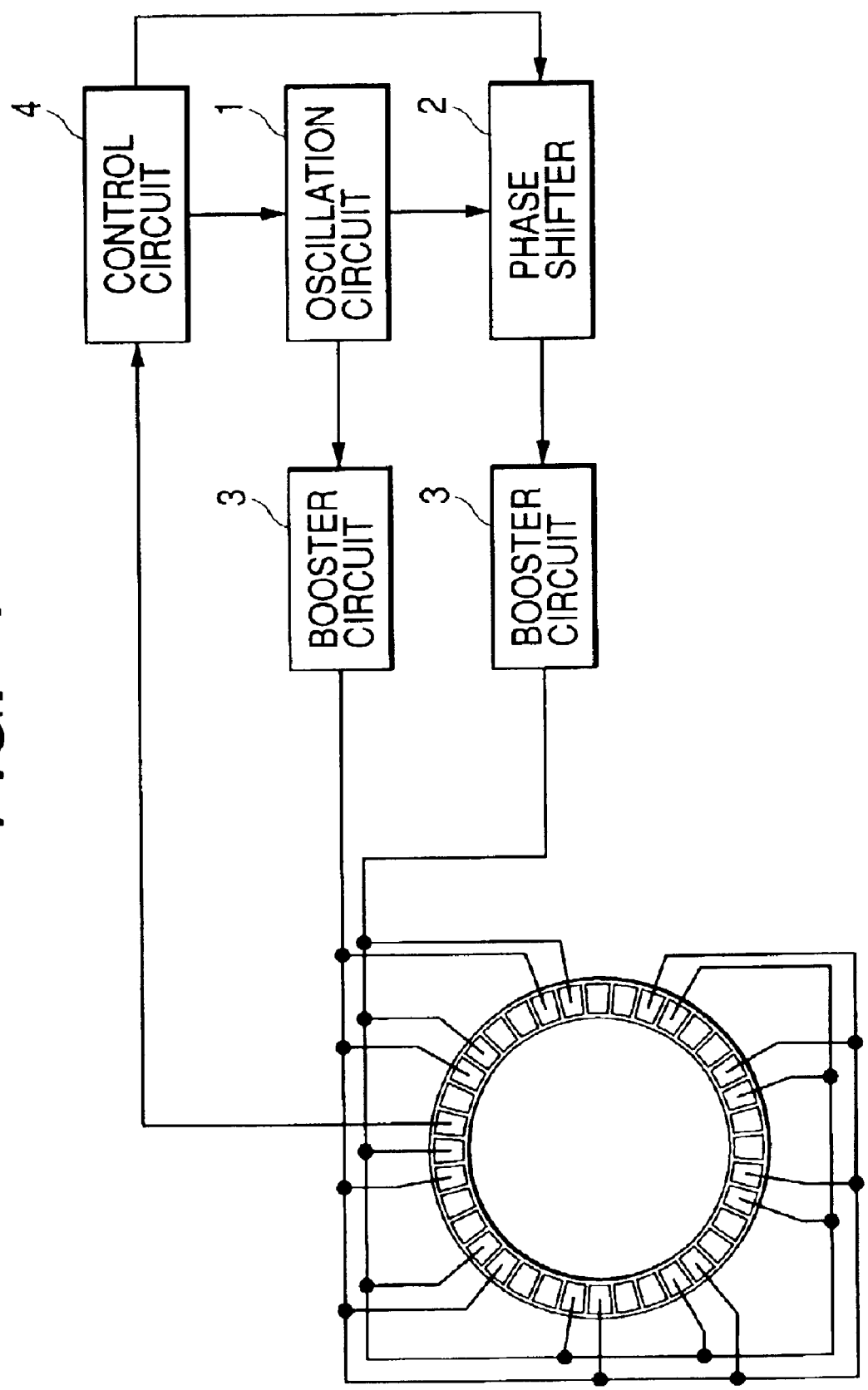
FIG. 4 is a block diagram showing the circuit structure of an ultrasonic motor in accordance with a second embodiment of the present invention.

FIG. 4 is a block diagram showing the circuit structure of an ultrasonic motor in accordance with a second embodiment of the present invention. In this embodiment, the two-phase ac voltages of A phase and B phase as shown in FIG. 2 are applied to conduct the driving as in the first embodiment.

In this embodiment, a voltage of the electrode region at a portion corresponding the anti-node of the vibration wave of A phase, among the electrode regions that are not used for applying the ac voltage which is a driving signal, is inputted to the control circuit 4 as a vibration monitor signal. With this structure, the vibration amplitude of the vibration member is detected.

Figure 11:
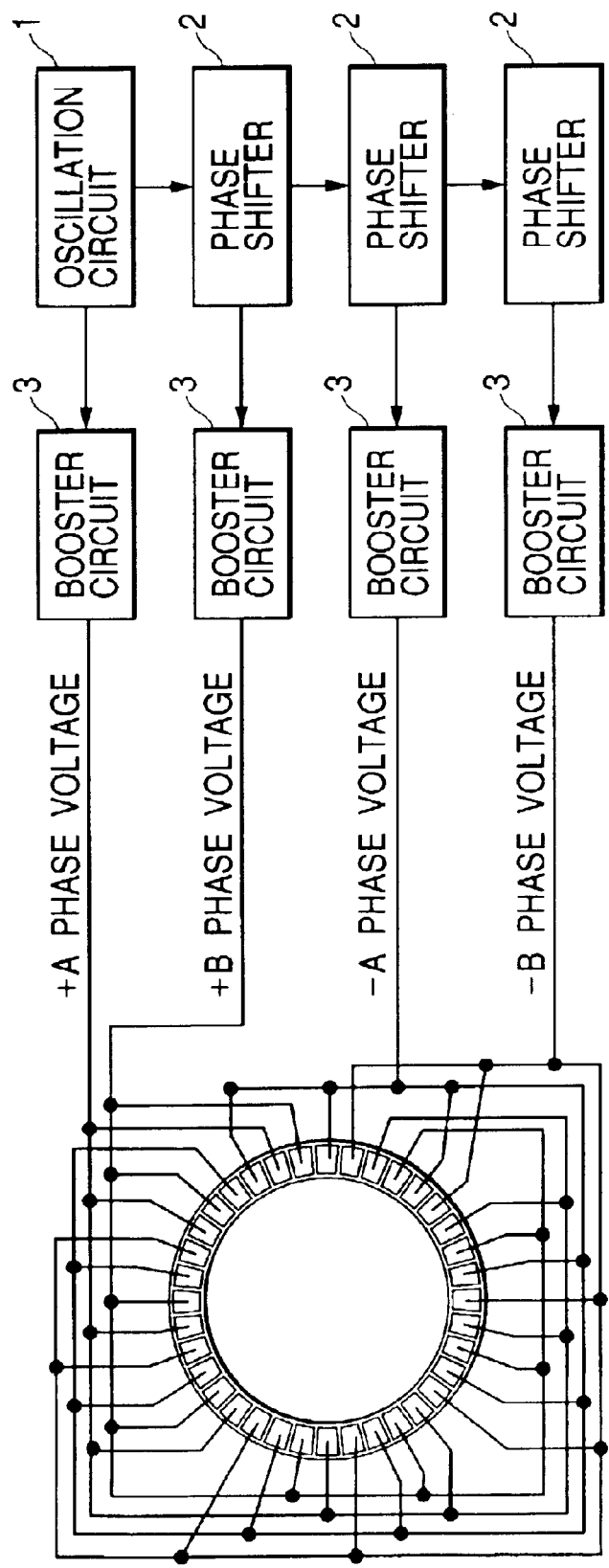
FIG. 11 is a block diagram showing a conventional circuit structure of an ultrasonic motor having the piezoelectric element shown in FIG. 10.
Figure 12:
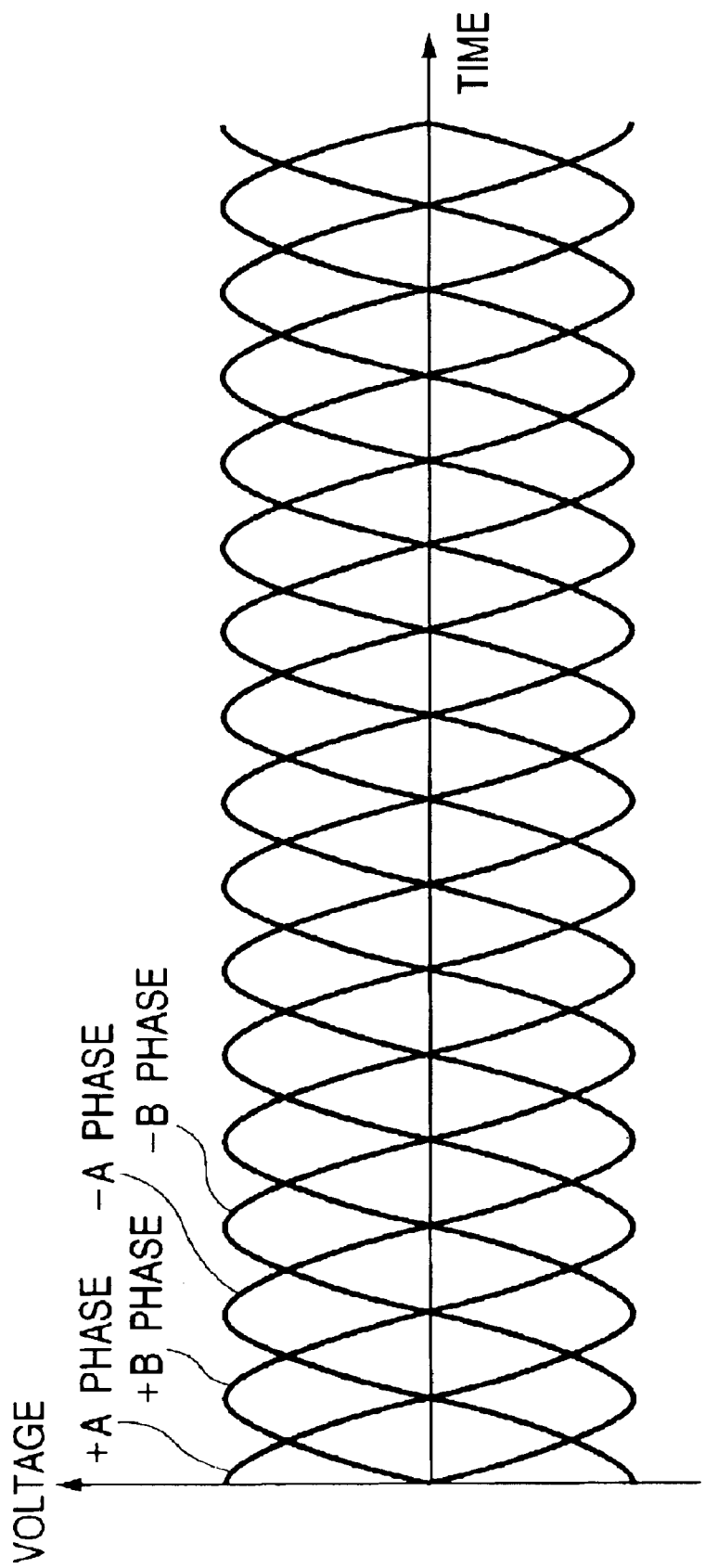
FIG. 12 is a graph showing a driving signal waveform of the circuit shown in FIG. 11.

In case of the circuit structure shown in FIG. 11, when one electrode region for obtaining the vibration monitor signal is to be ensured, the driving signal is not applied to only that electrode region with the result that a variation occurs in the vibration amplitude. However, according to this embodiment, since the vibration monitor signal is obtained from the electrode regions that are not naturally used for applying the driving signal, the driving signal can be uniformly applied to the overall periphery of the annular vibration member, as a result of which no variation occurs in the vibration amplitude.

The control circuit 4 adjusts the outputs of the oscillation circuit 1 and the phase shifter 2 in such a manner that the vibration amplitude becomes a given value, and controls the driving frequency and the driving voltage of the ultrasonic motor, or the phase difference of the two-phase ac signal. As a result, the driving state of the ultrasonic motor can be maintained constant.

Also, although will not be described in detail because of a known method, there may be applied a method of controlling the driving frequency so that the phase difference between the vibration monitor signal and the driving voltage becomes a given voltage.

In this embodiment, in order to detect the vibration state, a voltage at a portion corresponding to the anti-node of the standing wave of any phase among the electrodes to which the driving signal is not applied is used as the monitor signal. However, the present invention is not limited to this structure, but it is possible that signals of a plurality of electrodes to which no voltage is applied are electrically connected to each other and used as monitor signals. Since the signals of a plurality of electrodes are electrically connected to each other, the vibration state can be averaged. Also, the electrode which is not used for driving and detection is electrically released or grounded.

As described above, according to this embodiment, in addition to the above-mentioned advantages of the first embodiment, it is possible to conduct the control that maintains the driving state of the ultrasonic motor constant by obtaining the vibration monitor signal from the electrode region of the piezoelectric element.

Figure 5:
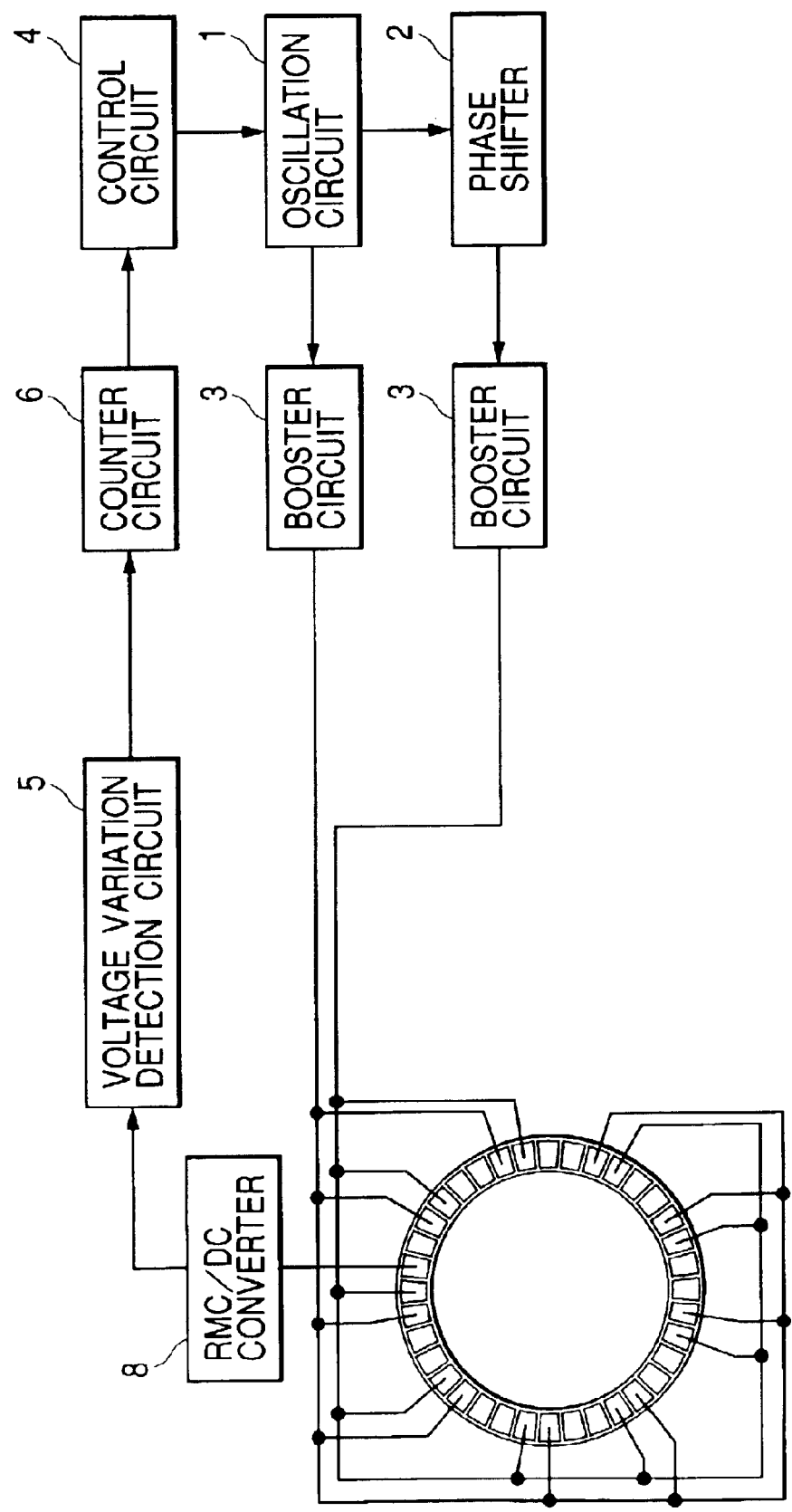
FIG. 5 is a block diagram showing the circuit structure of an ultrasonic motor in accordance with a third embodiment of the present invention.

FIG. 5 is a block diagram showing the circuit structure of an ultrasonic motor in accordance with a third embodiment of the present invention. In this embodiment, the two-phase ac voltages of A phase and B phase as shown in FIG. 2 are applied to conduct the driving as in the first embodiment.

In this embodiment, the voltage in the electrode region that is not used for applying the ac voltage which is the driving signal is converted into amplitude information by an MS/DC converter 8, and an output of the MS/DC converter 8 is inputted to a voltage variation detection circuit 5. The number of times of voltage variations which are detected by the voltage variation detection means is counted by a counter circuit 6, to thereby detect the rotation angle of the ultrasonic motor. The details will be described below.

Figure 6:
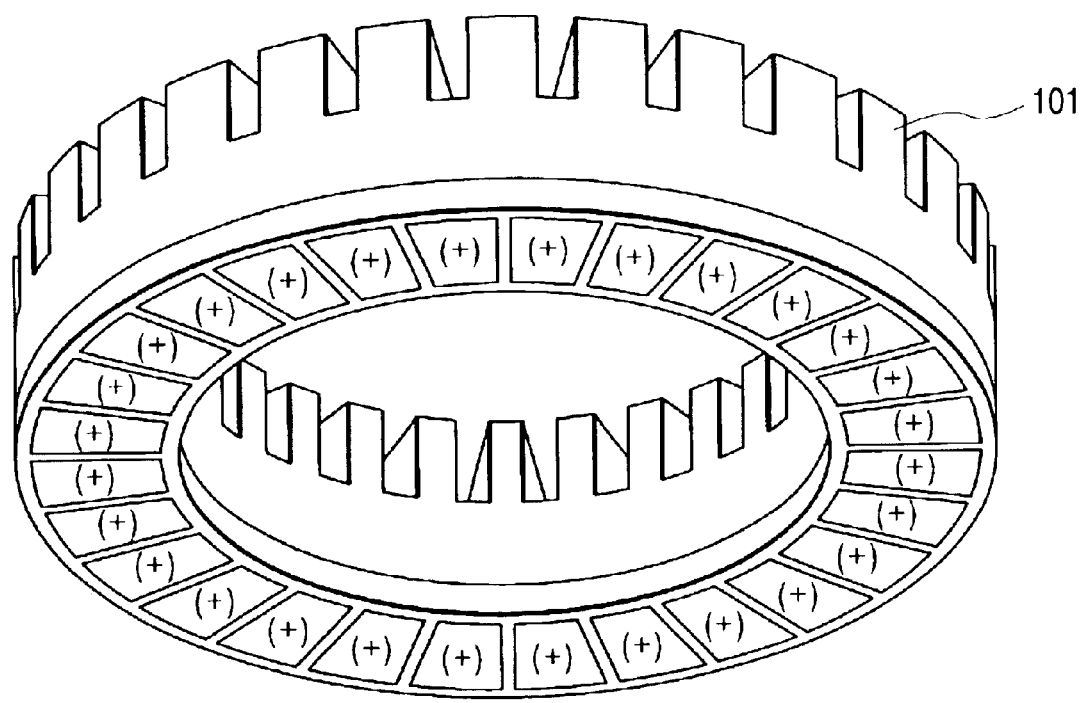
FIG. 6 is a perspective view showing a vibration member of the ultrasonic motor.

The vibration member of the ultrasonic motor is equipped with comb teeth 101 in order to enlarge a displacement in a portion of the vibration member which is in contact with the rotor as shown in FIG. 6. Since the flatness of the rotor is not completely flat in the strict sense, the vibration variation occurs in accordance with the contact of the comb teeth with the rotor. When the vibration variation is pulsed and the count operation is conducted by the counter, a count value becomes the movement angle of the ultrasonic motor. The movement angle (deg) can be obtained by the following calculation.

(movement angle[deg])=(count value)/(the number of comb teeth of the vibration member)×360

As described above, according to this embodiment, the amplitude variation is detected from the electrode region of the piezoelectric element, thereby being capable of obtaining the rotation angle of the ultrasonic motor. The ultrasonic motor is controlled on the basis of the rotation angle so that the rotation position and the rotation speed thereof can be controlled even if a sensor such as an encoder which has been required to control the rotation speed and the rotation position in prior are is not employed, thereby being capable of realizing the inexpensive control circuit.

Similarly, the electrode which is not used for driving or detection is electrically released or grounded as in the aforementioned embodiments.

Figure 7:
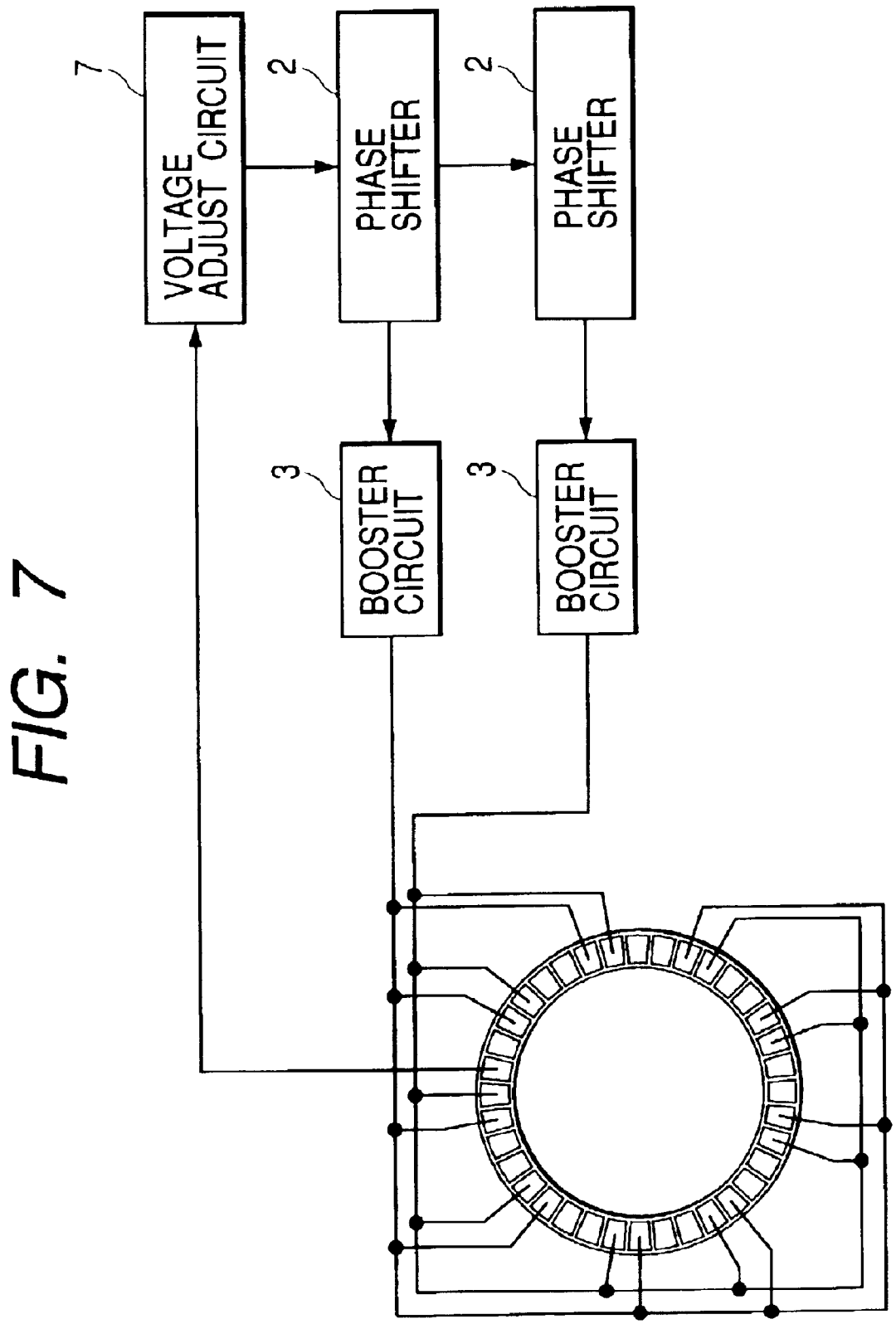
FIG. 7 is a block diagram showing the circuit structure of an ultrasonic motor in accordance with a fourth embodiment of the present invention.
Figure 8:
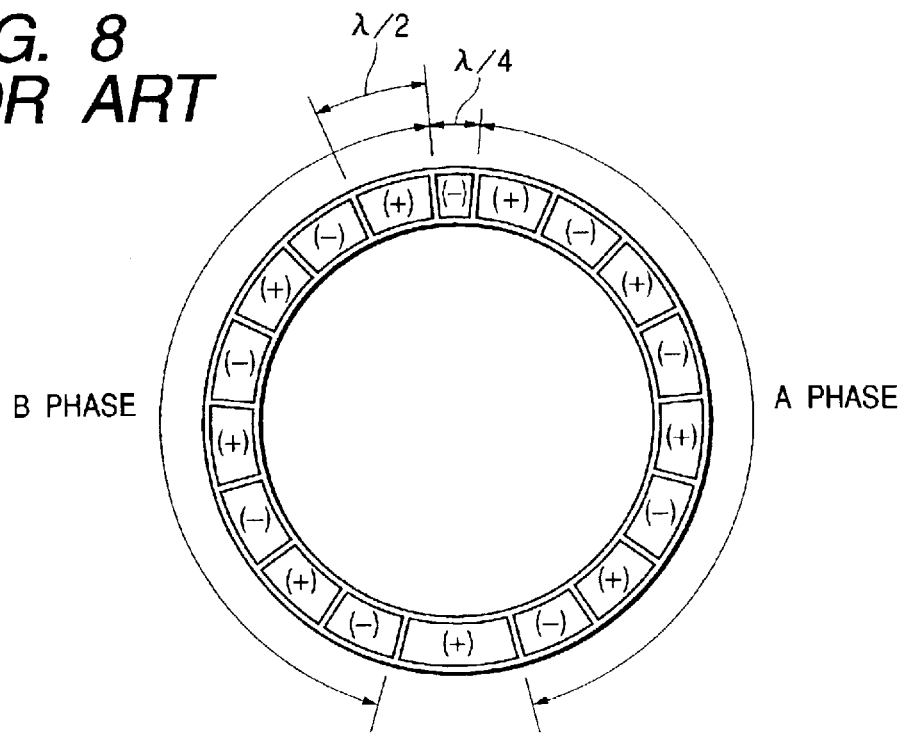
FIG. 8 is a diagram showing an electrode pattern of a conventional piezoelectric element having driving electrode regions in every ½ of a wavelength λ of a standing wave.
Figure 9:
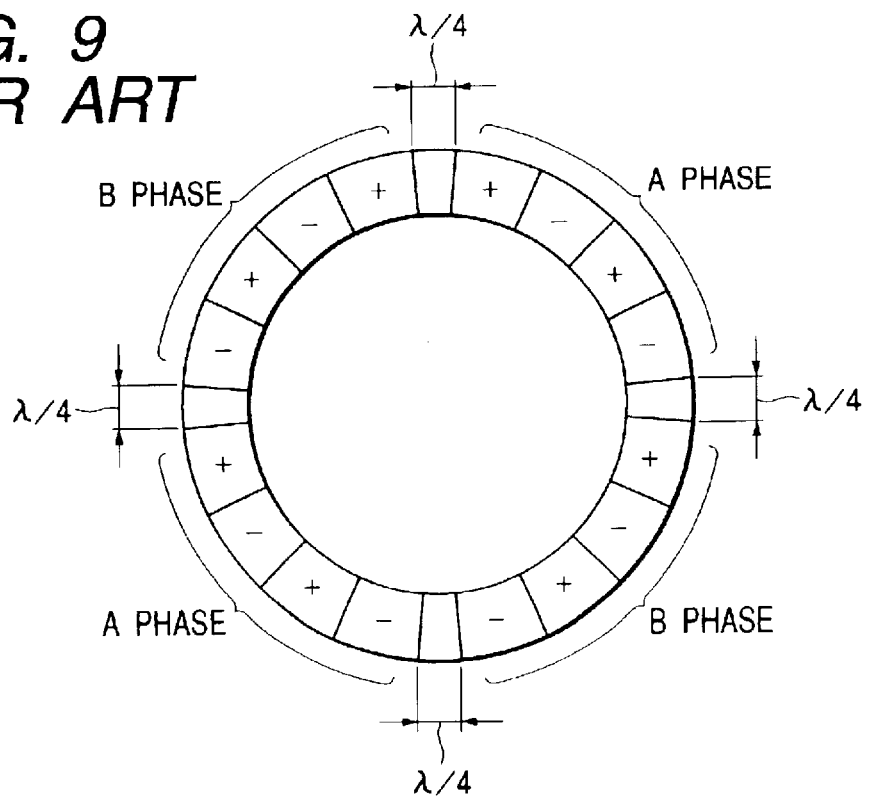
FIG. 9 is a diagram showing an electrode pattern of another conventional piezoelectric element having driving electrode regions in every ½ of a wavelength λ of a standing wave.

FIG. 7 is a block diagram showing the circuit structure of an ultrasonic motor in accordance with a fourth embodiment of the present invention. In this embodiment, the two-phase ac voltages of A phase and B phase as shown in FIG. 2 are applied to conduct the driving as in the first embodiment.

In this embodiment, the voltage in the electrode region of A phase which is not used for applying the ac voltage which is the driving signal is adjusted so as to have a given voltage amplitude by a voltage adjust circuit 7, subjected to phase conversion by the phase shifter 2, and boosted by the booster circuit 3 so as to act as the ac voltage for A-phase driving of the ultrasonic motor, to thereby structure a self-excited oscillation circuit.

In the B-phase, the signal from the phase shifter 2 is converted in phase by another phase shifter 2, and a signal which is boosted by the booster circuit 3 is supplied as the ac voltage.

With the above-mentioned structure, even if there is a difference in the resonance frequency between the respective vibration members of the ultrasonic motor and a change in the resonance frequency of the vibration member depending on the temperature or the load of, the driving of the ultrasonic motor can be always stabilized, and the circuit can be remarkably simplified.

Similarly, in this embodiment, the electrode which is not used for driving or detection is electrically released or grounded as in the aforementioned embodiments.

As described above, according to the present invention, in order to improve the vibration amplitude variation of the ultrasonic motor, even in the ultrasonic motor structured in such a manner that all the polarization directions of the piezoelectric element are the same, and the voltage is uniformly applied to the piezoelectric element on the annular vibration member, 4-phase ac signal which has been required in prior art can be reduced to 2 phases, thereby being capable of simplifying the circuit.

Also, according to the present invention, the vibration state can be detected from the electrode region of the piezoelectric element.

The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A vibration wave driving apparatus, comprising:
   an elastic member;
   an electro-mechanical energy conversion element having a plurality of electrode regions which are fixed to the elastic member and polarized in the same direction, wherein the elastic member generates a travelling wave which is obtained by synthesizing a plurality of standing waves on a surface thereof by supplying an ac signal to the electro-mechanical energy conversion element;
   a moving member which is in contact with the elastic member and driven by the travelling wave; and
   a plurality of wiring members which are connected to the plurality of electrode regions of the electro-mechanical energy conversion element,
   wherein wiring members used for generating standing waves having the same phase among the plurality of wiring members are arranged on only electrode areas at intervals integer times the wavelength of the standing waves having the same phase.

2. A vibration wave driving apparatus according to claim 1, wherein the wiring members used for generating the standing waves having the same phase are arranged at intervals of one wavelength of the standing waves having the same phase.

3. A vibration wave driving apparatus according to claim 1, wherein electrode regions which are not connected with the plurality of wiring members among the plurality of electrode regions are electrically released.

4. A vibration wave driving apparatus according to claim 1, wherein electrode regions which are not connected with the plurality of wiring members among the plurality of electrode regions are electrically grounded.

5. A vibration wave driving apparatus according to claim 1, wherein the plurality of wiring members include a wiring member used for detecting a vibration generated in the elastic member in addition to the wiring members used for generating the plurality of standing waves.

6. A vibration member, comprising:
   an elastic member;
   an electro-mechanical energy conversion element having a plurality of electrode regions which are fixed to the elastic member and polarized in the same direction, wherein the elastic member generates a travelling wave which is obtained by synthesizing a plurality of standing waves on a surface thereof by supplying an ac signal to the electro-mechanical energy conversion element; and
   a plurality of wiring members which are connected to the plurality of electrode regions of the electro-mechanical energy conversion element,
   wherein wiring members used for generating standing waves having the same phase among the plurality wiring members are arranged on only electrode areas at intervals integer times the wavelength of the standing waves having the same phase.

7. A vibration member according to claim 6, wherein the wiring members used for generating the standing waves having the same phase are arranged at intervals of one wavelength of the standing waves having the same phase.

8. A vibration member according to claim 6, wherein electrode regions which are not connected with the plurality of wiring members among the plurality of electrode regions are electrically released.

9. A vibration member according to claim 6, wherein electrode regions which are not connected with the plurality of wiring members among the plurality of electrode regions are electrically grounded.

10. A vibration member according to claim 6, wherein the plurality of wiring members include a wiring member used for detecting a vibration generated in the elastic member in addition to the wiring members used for generating the plurality of standing waves.

11. A driving system for a vibration wave driving apparatus, comprising:
   a vibration wave driving apparatus which fixes an electro-mechanical energy conversion element having a plurality of electrode regions all of which are polarized in the same direction to an elastic member, and which generates a travelling wave which is obtained by synthesizing a plurality of standing waves different in phase on a surface of the elastic member by supplying an ac signal to the electro-mechanical energy conversion element;
   a signal supply circuit for generating the ac signal which is supplied to the electro-mechanical energy conversion element; and
   a plurality of wiring members which connect the signal supply circuit to the plurality of electrode regions of the electro-mechanical energy conversion element,
   wherein wiring members used for generating standing waves having the same phase among the plurality of wiring members are arranged on only electrode areas at intervals integer times the wavelength of the standing waves having the same phase.

12. A driving system for a vibration wave driving apparatus according to claim 11, wherein the wiring members used for generating the standing waves having the same phase are arranged at intervals of one wavelength of the standing waves having the same phase.

13. A driving system for a vibration wave driving apparatus according to claim 11, wherein electrode regions which are not connected with the plurality of wiring members among the plurality of electrode regions are electrically released.

14. A driving system for a vibration wave driving apparatus according to claim 11, wherein electrode regions which are not connected with the plurality of wiring members among the plurality of electrode regions are electrically grounded.

15. A driving system for a vibration wave driving apparatus according to claim 11, wherein the plurality of wiring members include a wiring member used for detecting a vibration generated in the elastic member in addition to the wiring members used for generating the plurality of standing waves.

16. A driving system for a vibration wave driving apparatus according to claim 11, wherein the plurality of wiring members include a wiring member used for detecting a signal generated in the electro-mechanical energy conversion element in addition to the wiring members used for generating the plurality of standing waves, and wherein the signal supply circuit changes one of the frequency of the ac signal, the signal amplitude and the signal phase difference in accordance with the detected signal.

17. A driving system for a vibration wave driving apparatus according to claim 11, wherein the plurality of wiring members include a wiring member used for detecting a signal generated in the electro-mechanical energy conversion element in addition to the wiring members used for generating the plurality of standing waves, and wherein the signal supply circuit includes a self-excited oscillation circuit using the detected signal.

* * * * *

UNITED STATES PATENT AND TRADEMARK OFFICE
CERTIFICATE OF CORRECTION

PATENT NO. : 6,952,073 B2
DATED : October 4, 2005
INVENTOR(S) : Shinji Yamamoto

It is certified that error appears in the above-identified patent and that said Letters Patent is hereby corrected as shown below:

Column 7,
Line 53, "will" should read -- it will --.

Column 10,
Line 24, "plurality" should read -- plurality of --.

Signed and Sealed this

Twenty-third Day of May, 2006

JON W. DUDAS
*Director of the United States Patent and Trademark Office*